INVENTOR
Edward G. DeHart
BY Jack Lowsen
ATTORNEY

United States Patent Office
3,444,372
Patented May 13, 1969

3,444,372
PHOTOGRAPHIC PHOSPHOR BELT
Edward G. De Hart, Cambridge, Mass., assignor to De Haart, Inc., Burlington, Mass., a corporation of Massachusetts
Continuation-in-part of application Ser. No. 334,710, Dec. 31, 1963, now Patent No. 3,273,477. This application Sept. 16, 1966, Ser. No. 580,053
Int. Cl. H01j 1/62
U.S. Cl. 250—71      6 Claims

ABSTRACT OF THE DISCLOSURE

A reuseable phosphor-coated film belt for use in a camera of the kind disclosed in Patent 3,273,477 is shown and described. In one preferred embodiment the resolving power of the belt is improved over the phosphor films of the prior art by the orientation of crystals perpendicular to the film plane, and by the use of an infra-red-passing, actinic-reflecting binder. In another, the oriented crystals spread on a thin Mylar film are backed by a thin evaporated film of aluminum, conforming to and partially surrounding the individual crystals. The aluminum surface is further backed by a base strip yielding a sandwich type tape which has a smooth protective tape at either side of the active phosphor.

---

Figure 1:
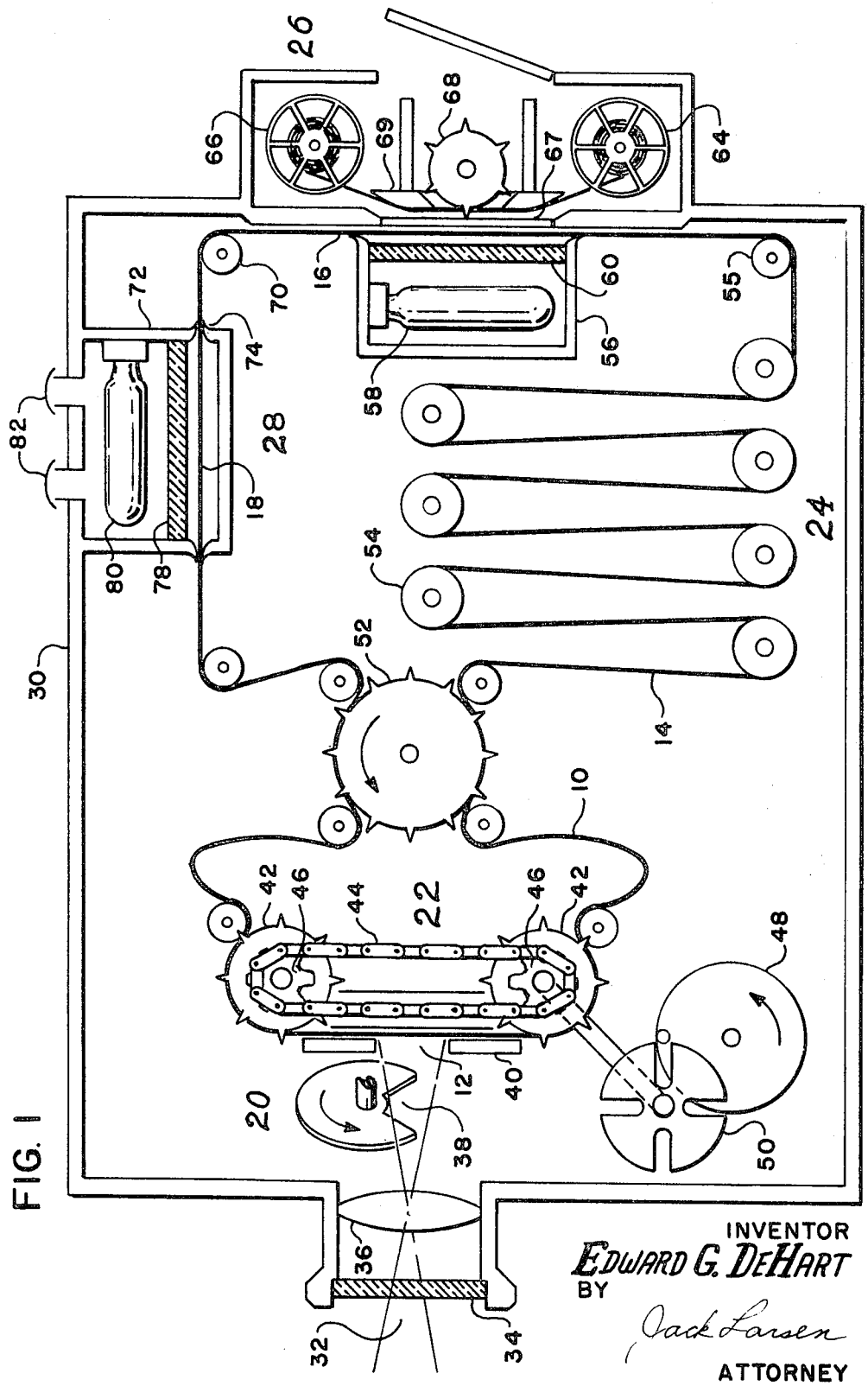

This application is a continuation-in-part of my co-pending application Ser. No. 334,710, filed Dec. 31, 1963, for random events camera and method and now Patent No. 3,273,477 granted Sept. 20, 1966.

The present invention relates to a unique film for photographically recording random events, i.e., events which occur at some unpredictable future time.

More specifically stated, the instant invention has to do with an improved reuseable phosphor-coated film belt for recording random events, storing these recorded events, permanently recording selected events, and subsequently erasable for further use. The apparatus and method disclosed in the patent have given a remarkable contribution to the art by providing a method of recording photographs of random events on the novel reuseable phosphor belt using apparatus which minimizes cost while maintaining optimum durability and efficiency.

An economical system for the recording of random events, and for obtaining data and information concerning them, has long been sought both by science and by industry. Such a system has been sought as a means of selectively monitoring these random events with a view towards anticipating them and eventually preventing them. As examples of repetitious random events which are suitable for recording, except for the prohibitive cost of prior methods, mention may be made of airplane crashes (as viewed from inside the cockpit or from the end of an airport runway), robberies (and burglaries using infra-red flash) of banks, random breakdowns or failures in mechanical equipment, materials testing where failure time is unpredictable, and many other events of a similarly unpredictable nature.

Generally speaking, previous systems for the recording of such events fell into one of two classes. One class, conventional silver-halide photography, requires only a relatively small initial capital outlay but it involves a large and continuing expense to keep a camera supplied with film—due to its non-erasable nature. The other class, magnetic or video tape-type systems, avoid the continuing supply cost problems of silver halide photography, but require high original capital outlay for complex and expensive equipment that is prohibitive in all but the largest of operations. Yet, it is manifest that visual evidence of what occurred in prior airplane crashes, for example, would be of enormous assistance in preventing similar future events . . . with an attendant saving of many human lives.

Phosphor photography has long been known as a curiosity and as a tool for special purposes, such as the visualization of infra-red radiation. However, such known phosphor photographic systems were limited in resolution and picture quality and when used were limited to reproduction of oscillograms, the detection of pin-holes and the like.

Film of the quality required for the forgetting camera disclosed in the patent has heretofore not been available. The novel film of the present invention is coated with a phosphor which absorbs energy from light of an energizing frequency and which releases a portion of that energy by emission of light at a lower frequency when stimulated with light of still lower frequency. After a latent image is received on a frame of film it is transported to a dark memory portion of the camera. Later, for retrieval the frame may be transported to a readout section for printing by exposing the phosphor of said frame to light of the proper stimulating frequency and recording the light thus released. Passing the exposed medium through an erase section where the medium is de-energized prepares it for recycling through the same process.

It is therefore the primary object of this invention to provide a phosphor coated film belt for use in the novel apparatus of the patent.

Other objects of the instant invention will be more readily ascertained from an inspection of the following specification taken in conjunction with the accompanying drawings, while the features of novelty will be more distinctly pointed out in the appended claims.

Figure 2:
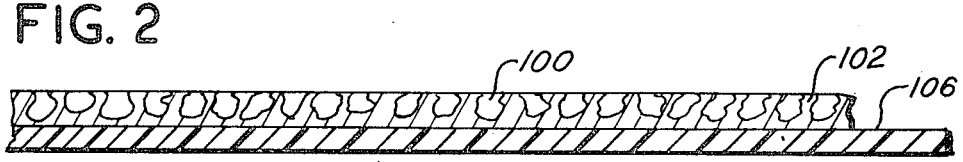
Figure 3:
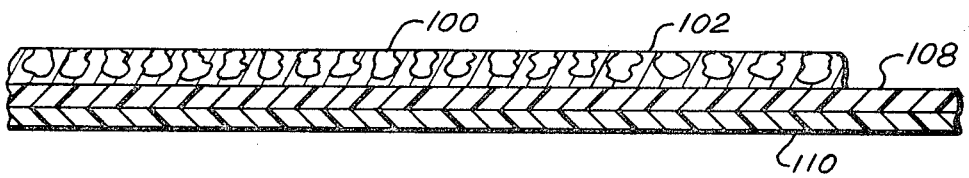
Figure 4:
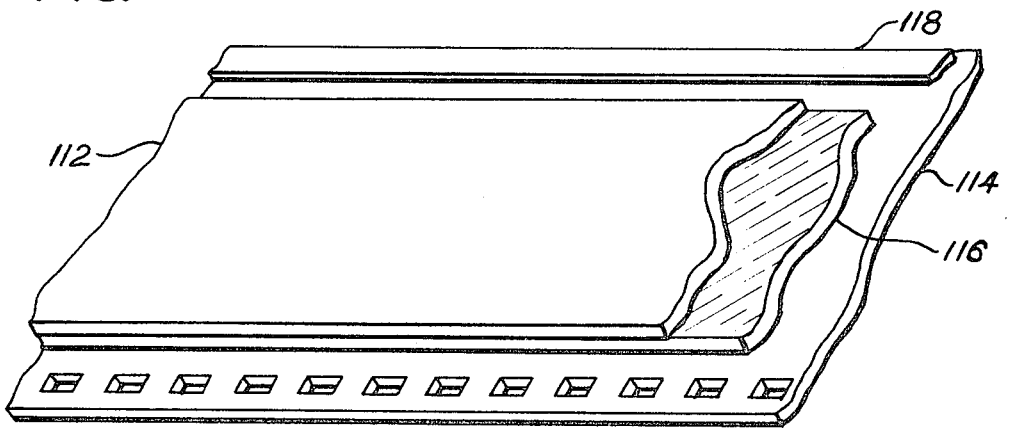
Figure 5:
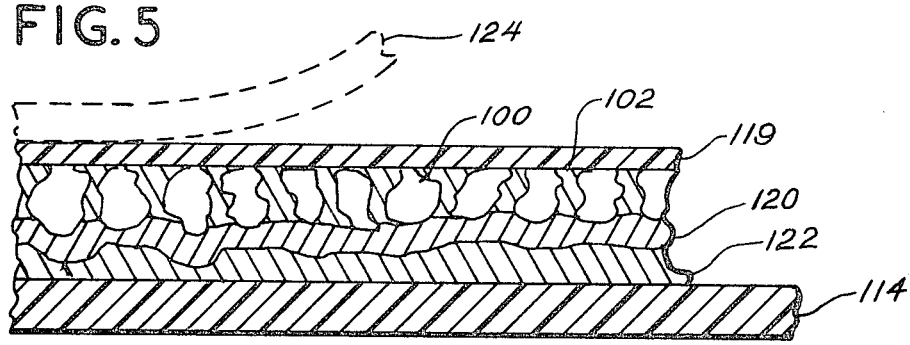

In the accompanying drawings:

FIGURE 1 illustrates the preferred embodiment of the novel apparatus for the above-mentioned patent, FIGURE 2 is a cross sectional view of the novel reuseable recording medium of this invention, FIGURE 3 is a cross sectional view of an alternate embodiment of the recording medium illustrated by FIGURE 2, FIGURE 4 is a partially cut away view of another alternate embodiment of the recording medium of this invention, and FIGURE 5 is a further alternative embodiment.

The patent discloses apparatus for recording random events which comprises a lens for focussing a pattern of suitable radiation to form a latent image upon an endless belt coated with a phosphor such as zinc sulphide activated with lead and copper; and means for making a plurality of such exposures in a cinematic manner, viz. a series of separate images, taken at intervals in a continuing cycle. The apparatus further comprises means for passing the thus exposed film through a memory bank mechanism to store a predetermined number of images or "frames." The apparatus still further comprises means for passing the film through a printout mechanism, an erasure mechanism and means for passing the film through said erasure mechanism. Thus the apparatus is constantly recording random events as the endless belt is continuously recycled with each separate image being subsequently erased automatically until a permanent record is desired, at which time the printout means is activated.

The process of the patent is illustrated by the embodiment disclosed in FIGURE 1 which shows a continuous belt of film 10 exposed at frame 12. Film belt 10 may conveniently be divided into a memory bank section 14, a printout or readout section 16 and an erasing section 18. It is to be noted that the number of frames which need be stored depends upon the nature of the recorded events and the time lapse between the initial recording and the final reading out.

Once more with reference to FIGURE 1 it is seen that this random events camera, in its simplest form, must include an exposure mechanism 20, a drive mechanism 22, a memory bank mechanism 24, a read out mechanism 26 and an erasure mechanism 28. For example, a point e.g., exposed frame 12, on film belt 10 is made to progressively pass through exposure mechanism 20, memory bank mechanism 24, read out mechanism 26 and through erasure mechanism 28, at which time the cycle is repeated.

Again referring to FIGURE 1, it is shown that a preferred embodiment of the camera comprises a camera housing 30 which is "light tight" to those types of radiation to which the phosphors on film belt 10 are photosensitive. Housing 30 is seen to define an aperture 32, an entrance filter 34 and a focussing lens system 36, and a shutter 38 mounted within housing 30 coaxial of said filter, lens and aperture. In the preferred embodiment the entrance filter 34 is substantially opaque to infra-red radiation. A spring-loaded pressure plate 40 is mounted behind shutter 38. Plate 40 maintains the phosphor-coated film belt 10 in a fixed position during exposure and acts as a guide when film belt 10 is translated to bring the adjacent frame into position for exposure. The main drive mechanism for film belt 10 is a pair of sprocket wheels 42 which are spaced from one another and are placed at opposing sides of pressure plate 40. A driving relationship is achieved by indexing a continuous series of holes along one or both edges of film belt 10 and with the teeth of sprocket wheels 42. Movement of these sprocket wheels is coordinated by means of a drive chain 44 which is adapted, alternatively to engage either a pair of first gear members 46 or sprocket wheels 42. This overall drive force is transmitted from a variable drive means 48 to a star wheel 50 which in turn is connected in driving relation to one of the sprocket wheels 42. The variable drive means 48 is also connected to a sprocket guide wheel 52 which assists in driving film belt 10. The driving force of guide wheel 52 is not brought to bear upon that section of film belt 10 between sprocket wheels 42 because there are loops formed in said film between each of said sprocket wheels and guide wheels 52.

A series of rollers 54 make up the major elements of memory bank mechanism 24. Film belt 10 is threaded around rollers 54 as shown in FIGURE 1. The final roller 55 of the memory bank mechanism is spaced from readout mechanism 26 and is on substantially the same plane. This provides means for guiding film belt 10 from memory bank mechanism 24 to readout mechanism 26. Readout mechanism 26 comprises a generally light-weight readout-lamp enclosure 56 and a readout lamp 58 mounted within enclosure 56 and in electrical communication with a suitable means of energy (not shown). Lamp enclosure 56 defines a window in a side of the housing 30 contiguous to film belt 10. A readout filter 60 fills this window so that radiation generated by readout lamp 58 passes through filter 60 and impinges upon film belt 10. The properties of readout filter 60 are so chosen that the impinging radiation causes the phosphor to radiate, as actinic rays, a portion of the energy stored in the latent image which previously had been impressed in film belt 10 by the energizing of the phosphor resulting from the exposure by lens system 36.

Still referring to FIGURE 1, there is illustrated a conventional silver-halide photosensitive film strip 62 wound upon a storage reel 64 and threaded about a take-up reel 66. The strip 62 is shown separated from the belt 10 by a thin, smooth metal slide 67. Intermediate the two reels 64 and 66 is a film sprocket wheel 68 which is rotatably mounted such that its teeth index with sprocket holes in both film belt 10 and film strip 62. Sprocket wheel 68, slide 57, and a platen 69 are all movable to permit the camera to make a permanent record on the strip 62 when one is required.

In its normal "forgetting" mode of operation, no permanent records are taken.

For recording, the slide 67 is removed, the sprocket 68 is engaged, and the belt 10 and strip 62 are drawn through the readout mechanism 26 with each frame on the film belt 10 held in intimate contact-printing relationship with the photosensitive strip 62 by pressure of the platen 69. In this manner, the temporarily stored images on film belt 10 may be copied for a more permanent record. The permanent record is then made from the silver-halide film by well known development techniques.

A preferred embodiment of readout filter 60 transmits radiation only in the infra-red region. For maximum contrast in the permanent record, the intensity of the stimulating infra-red radiation transmitted by filter 80 is held to a level which leaves most of the stored energy in film belt 10. To prepare the film belt for a recirculation through the camera, it is passed through erasing mechanism 28. Guided by a roller 70, the belt enters an erasure lamp enclosure 72 rendered generally light-tight by light-seals 74. An erase filter 78 excludes energizing radiation emitted by erasure lamp 80 from the film belt while permitting it to be fully erased by the stimulating radiation emitted from lamp 80. A preferred embodiment of filter 78 is substantially transparent to infra-red radiation but need not cut off between red and infra-red so sharply as the filter 60. Cooling vents 82 pass air but not light. From erasure mechanism 28, film belt 10 is guided by second guide roller 84 back to sprocket guide wheel 52 from whence it begins another circuit of the camera.

In the preferred embodiment of the camera, then, film belt 10 is energized by light in the visible to near ultraviolet portion of the spectrum and stimulated by infrared radiation. For this a film comprising a polystyrene base, coated on one side with a butylmethacrylate binder containing comminuted phosphor zinc sulphide doubly activated with lead and copper has been found satisfactory and is preferred. Other combinations may be formulated to meet diverse operational requirements. Indeed great sensitivity is achieved by using a strontium-sulphide doubly activated with samarium and yttrium.

For purposes of the appended claims phosphors which store energy at a short wavelength and subsequently emit at an intermediate wave length under stimulation by a long wavelength are termed storage phosphors to distinguish them from the better known persistent phosphors.

The resolving power of the previously described camera system depends to a large degree upon the quality of the phosphor film used. Phosphorescence is a property of the crystal. Accordingly the property is not lost as the crystals are made smaller as long as there are at least several hundred atoms in each crystal.

As shown in FIGURE 2, the phosphor tape comprises a number of different components for optimum performance. The elements of this photo-sensitive phosphor tape, in order, as they would be encountered by a ray of light from a scene to be recorded, defined as from "front to back," comprise phosphor particles 100, a binder 102 (preferably butylmethacrylate) and a polystyrene strip 106. The mechanical properties of these elements must be such that they will adhere together.

FIGURE 3 depicts an alternative embodiment of the phosphor tape shown in FIGURE 2. This embodiment is seen to comprise again from front to back phosphor particles 100, binder 102, a second binder 108 and a reflective backing 110. It is desired that the above components have certain specific optical properties. Phosphor particles 100, are energized by high frequency radiation, which for convenience is termed "violet" light emit a somewhat lower frequency radiation, which is termed herein "orange" light, and are capable of being stimulated by still shorter frequency radiation which is termed "infra-red." Binder 102 preferably transmits orange and violet and reflects or absorbs infra-red. Second binder 108 preferably is dyed to absorb some of the violet and orange and transmit infra-red, to provide attenuation of scattered light in the manner of the well known anti-halation backing of silver-halide films. It is preferable that reflective backing 110 transmits at least 25 percent of the infra-red and reflect at least 75 percent of the violet and orange light to provide increased sensitivity.

The process for laying down various layers may be any of several well-known processes for coating tape. It has been found acceptable to deposit the butyl methacrylate thinned to a liquid with methyl-ethyl ketone. It is apparent that some improvement in resolution results if phosphor particles 100 are oriented with their long dimensions perpendicular to the tape. This may be accomplished by a modification of the electromatic coating process disclosed in re-issue patent Re. 22,415, granted Jan. 11, 1944 to J. S. Smyser, covering a method for making abrasive articles.

FIGURE 4 illustrates a preferred adaptation of the phosphor tape for the camera apparatus of the patent. This adaptation is seen to comprise phosphor tape 112 bonded to carrier belt 114 by infra-red passing, actinic-reflecting adhesive 116. A measure of tape-length distance is provided by ordinate measuring means 118. This may be a magnetic recording coating or a coded pattern of inscribed lines, either of which may be employed to measure the distance separating any two frames.

Via the preceding specification, then, it will be readily apparent that the stated object of the present invention, among other objects, have been achieved. It should now be apparent that this invention is capable of a number of modifications. One such general modification should be mentioned namely the infra-red-recording, ultra-violet-erasing mode in which the erasing radiation is ultra violet, fully energizing the phosphor. The images are then created by infra-red light selectively exhausting the stimulated phosphor. Both basic phosphor processes are disclosed in patents to Urbach 2,482,813 and 2,482,815. In the infra-red photographic mode the anti-halation feature of the tapes of FIGURES 3 and 4 would be ineffective.

For this mode the modification of the tape shown in FIGURE 5 is preferred; and is regarded as the preferred embodiment of the invention. This is a so-called sandwich type because it has a smooth protective tape at either side of the active phosphor. In successive layers from front to back, the tape comprises a thin strip 119 of plastic, preferably "Mylar" polyester, phosphor particles 100, a binder 102, a thin layer of evaporated aluminum 120, an adhesive layer 122 and a film base 114. The thin (0.005") strip 119 is originally supported on a metal substrate 124 and when so supported is coated with particles 100 and clear binder 102 as in the configuration of FIGURE 2. The front end of each crystal 100 is surrounded and held by the clear binder while the back end of each crystal is exposed. The strip 119 being at the time on the bottom, the front ends of the particles 100 settle against it to present a relatively smooth surface of phosphor faces the strip 119, and the back ends of the particles 100 present a rough surface which is exposed on top. The rough surface with the back ends of the crystals protruding like cobblestones from the roadway, is then coated by evaporating aluminum over it in vacuum to form the layer 120 of sufficient thickness to reflect about 90 percent of the stimulating infra-red rays. The base strip 114 is then applied by a suitable adhesive, which may be butyl methacrylate made tacky by addition of the ketone and thereafter the original supporting substrate 124 of metal is stripped away.

Various materials have been used for the base strip 114. Mylar is preferred; but ordinary cellulose acetate motion-picture film base has been used successfully. A strip of stainless steel thin enough to transmit a good fraction of readout infra-red may also be used. The alloy "Vicalloy" and similar cobalt containing hard magnetic materials combines the desired optical and mechanical properties with a capacity to store additional data by magnetic recording means.

Other such modifications will be understood and the invention limited by the scope of the appended claims.

I claim:
1. A phosphor belt for random events camera, comprising,
    (a) a layer of comminuted crystals of storage phosphor,
    (b) said crystals being oriented generally so that the longer dimension of each crystal is substantially perpendicular to the surface of said layer,
    (c) the thickness of said layer being substantially the length of said crystals,
    (d) a plastic binder surrounding and holding the front end of each of said crystals and presenting a smooth surface toward the front of said belt, and
    (e) a backing layer conforming to the back ends of said crystals,
    (f) said backing layer being substantially opaque to the image-forming rays in said camera.
2. A belt as defined by claim 1 wherein, said binder comprises a material which is opaque to infra-red radiation and transparent to orange and violet radiation and binds said crystals.
3. A belt as defined by claim 2 in further combination with a base strip adherent to the back of said backing layer, and wherein together said backing layer and said base strip transmit at least 25% of the stimulating infra-red radiation of said phosphor incident on the back thereof and reflect at least 75% of the activating violet and emitted orange light incident on the front thereof.
4. A belt as defined by claim 1 comprising,
    (g) a flexible carrier tape adapted to transmit phosphor-stimulating radiation but opaque to the emission of said phosphor and to its energizing radiation, and
    (h) a layer of adhesive to join said backing layer and said tape.
5. A belt as defined by claim 4
    (i) wherein said backing layer is reflective of at least 75% of violet energizing light and orange emitted light and transmits at least 25% of infra-red stimulating light.
6. A belt as defined by claim 5
    (j) having a second binder between said first binder and said reflecting layer, said second binder being dyed to attenuate scattered rays of orange light.

References Cited

UNITED STATES PATENTS

| | | | |
|---|---|---|---|
| 2,740,050 | 3/1956 | Schultz | 250—71 X |
| 2,834,891 | 5/1958 | Ravich | 250—71 |
| 2,980,816 | 4/1961 | Payne | 250—71 X |
| 3,107,138 | 10/1963 | Le Massena | 250—71 X |

ARCHIE R. BORCHELT, *Primary Examiner.*

U.S. Cl. X.R.

250—80